(12) United States Patent
Schulz

(10) Patent No.: US 6,860,671 B2
(45) Date of Patent: Mar. 1, 2005

(54) D-RING ASSEMBLY WITH A LOAD LIMITING DEVICE

(75) Inventor: Kurt Schulz, Harper Woods, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 64 days.

(21) Appl. No.: 10/460,223

(22) Filed: Jun. 13, 2003

(65) Prior Publication Data

US 2004/0253048 A1 Dec. 16, 2004

(51) Int. Cl.[7] .................. F16C 11/10; B60R 22/00
(52) U.S. Cl. ............... 403/122; 403/125; 403/141; 403/142; 403/143; 280/801.1; 280/808
(58) Field of Search .................. 403/122–128, 403/141–143; 280/801.1, 801.2, 805, 806, 808

(56) References Cited

U.S. PATENT DOCUMENTS

| | | | | |
|---|---|---|---|---|
| 892,105 | A | * | 6/1908 | White ............ 403/141 X |
| 1,022,197 | A | * | 4/1912 | Kiel ............ 403/122 X |
| 3,286,545 | A | * | 11/1966 | Malachowski ........ 403/128 X |
| 3,978,276 | A | * | 8/1976 | Poffenberger et al. .. 403/141 X |
| 4,191,400 | A | * | 3/1980 | Smith ............ 280/808 |
| 4,394,050 | A | * | 7/1983 | Spooner .......... 280/801.1 X |
| 4,480,853 | A | * | 11/1984 | Ando et al. ........ 280/801.1 |
| 5,096,224 | A | * | 3/1992 | Murakami et al. ...... 280/808 |
| 5,588,767 | A | * | 12/1996 | Merlo ............ 403/128 |
| 5,603,527 | A | * | 2/1997 | Bee ............ 280/808 |
| 5,897,417 | A | * | 4/1999 | Grey | |
| 6,217,249 | B1 | * | 4/2001 | Merlo ............ 403/128 X |
| 6,644,692 | B2 | * | 11/2003 | Kang ............ 280/801.1 |
| 2002/0190517 | A1 | * | 12/2002 | Kang ............ 280/801.1 |

* cited by examiner

Primary Examiner—John R. Cottingham
Assistant Examiner—Ryan M. Flandro
(74) Attorney, Agent, or Firm—Lonnie Drayer; Jarett Rieger

(57) ABSTRACT

A D-ring assembly comprising a D-ring and a load limiting device. The D-ring has a slot therethrough for receiving a seatbelt webbing and for guiding the webbing from the retractor to the torso of a vehicle occupant. The load limiting device functions by absorbing kinetic energy of the vehicle occupant during a crash to control the deceleration forces experienced by the vehicle occupant. The load limiting device has a deforming member partially embedded in a swivel ball. When a predetermined amount of force is applied on the D-ring assembly, the swivel ball rotates causing the deforming member to create a channel in the load-limiting device.

17 Claims, 4 Drawing Sheets

D-RING ASSEMBLY WITH A LOAD LIMITING DEVICE

FIELD OF THE INVENTION

The present invention relates to an energy absorbing device for a restraint system and more particularly relates to a load limiter incorporated with seatbelt guide.

BACKGROUND OF THE INVENTION

Three point seat belt systems are well known in the art. They normally comprise a releasable buckle and connecting tongue adjustably attached to a continuous webbing. One end of the webbing is anchored to the vehicle's frame or seat adjacent to the floor, and the other end of the webbing is connected to a retractor through a web guide attached to the vehicle's side pillar proximate the shoulder height of a seated occupant. The portion of the webbing between the connecting tongue and the vehicle frame is normally referred to as the lap portion of the webbing and the portion of the continuous webbing between the connecting tongue and the web guide is referred to as the shoulder portion.

A conventional D-ring also referred to in the art as a web guide or a turning loop includes a metal support plate with a circular mounting opening and a slit through which the shoulder belt is slidingly received. A threaded bolt serves as the mounting member, which is secured to a threaded nut, which functions as a cooperating mounting member. The threaded nut can be part of a vertically adjustable height adjusting mechanism, or alternatively, the nut can be welded to a support pillar (B, C, or D) or to a part of a seat frame.

The seatbelt webbing is wound around the spool of the seatbelt retractor. The seatbelt webbing has a biasing force in the retraction direction, and this biasing force needs to be overcome to protract the seatbelt webbing from the seatbelt retractor. The biasing force on the seatbelt webbing is great enough to coil the continuous seatbelt webbing around the spool when the connecting tongue is disengaged from the releasable buckle, but the biasing force does not prevent a vehicle occupant from shifting position or leaning forward during seatbelt use. However, at the onset of a vehicle crash, the retractor locks and prevents further belt payout to restrain the occupant during the crash. The vehicle occupant is traveling at the same speed as the vehicle and during the crash both the vehicle and the vehicle occupant experience deceleration forces. In order to minimize vehicle occupant injury during a crash, the goal is to minimize the deceleration forces applied to the vehicle occupant. Thus, by lowering the level of vehicle occupant deceleration during a crash, the risk of injury is lowered.

A load limiting device is well known in the art for absorbing the kinetic energy of the vehicle occupant to control the deceleration of the vehicle occupant during a crash. The load limiting device is designed to absorb the kinetic energy of the occupant in a controlled manner and thereby minimize the deceleration forces in a predetermined manner as the occupant loads the belt during the collision. Such force dissipation allows controlled deceleration of the occupant during the collision.

The load limiter or energy absorbing mechanism is commonly associated with the retractor portion of the three point seat belt system. For example, a torsion bar installed in the center bore of the spool is well known in the art, which absorbs energy by twisting during a crash. However, there is a desire to identify alternative locations within the three point seatbelt system for a load limiter that is not associated with the retractor.

SUMMARY OF THE INVENTION

The D-ring assembly according to the present invention comprises a D-ring and a load limiting device. The load limiting device has a swivel member mounted in a socket. The swivel member is restricted from rotating by the presence of a deforming member. The deforming member is partially embedded in the surface of the swivel ball of the swivel member.

An aspect of the present invention is that the deforming member is made from a material that is harder than the socket. The deforming member is fixed to the swivel ball. Upon an application of force above a predetermined amount, the swivel ball rotates thereby creating a channel in the socket, and this deforming process absorbs kinetic energy of the occupant.

Another aspect of the present invention is that the deforming member is made from a material that is harder than the swivel ball. The deforming member is fixed to the socket. Upon an application of force above a predetermined amount, the swivel ball rotates thereby creating a channel in the swivel ball, and this deforming process absorbs kinetic energy of the vehicle occupant.

DETAILED DESCRIPTION OF THE INVENTION

The D-ring assembly 10 of the present invention has a load-limiting device 40 incorporated therein, which dissipates forces applied to the seat belt webbing, and allows controlled movement of an occupant during a vehicle collision. The load limiter of the present invention may be used in any of the 3 point seat belts in a vehicle. Three point seat belts are commonly utilized for vehicle occupants occupying front seats of a vehicle compartment and are becoming more common for vehicle occupants occupying rear seats.

Figure 1:
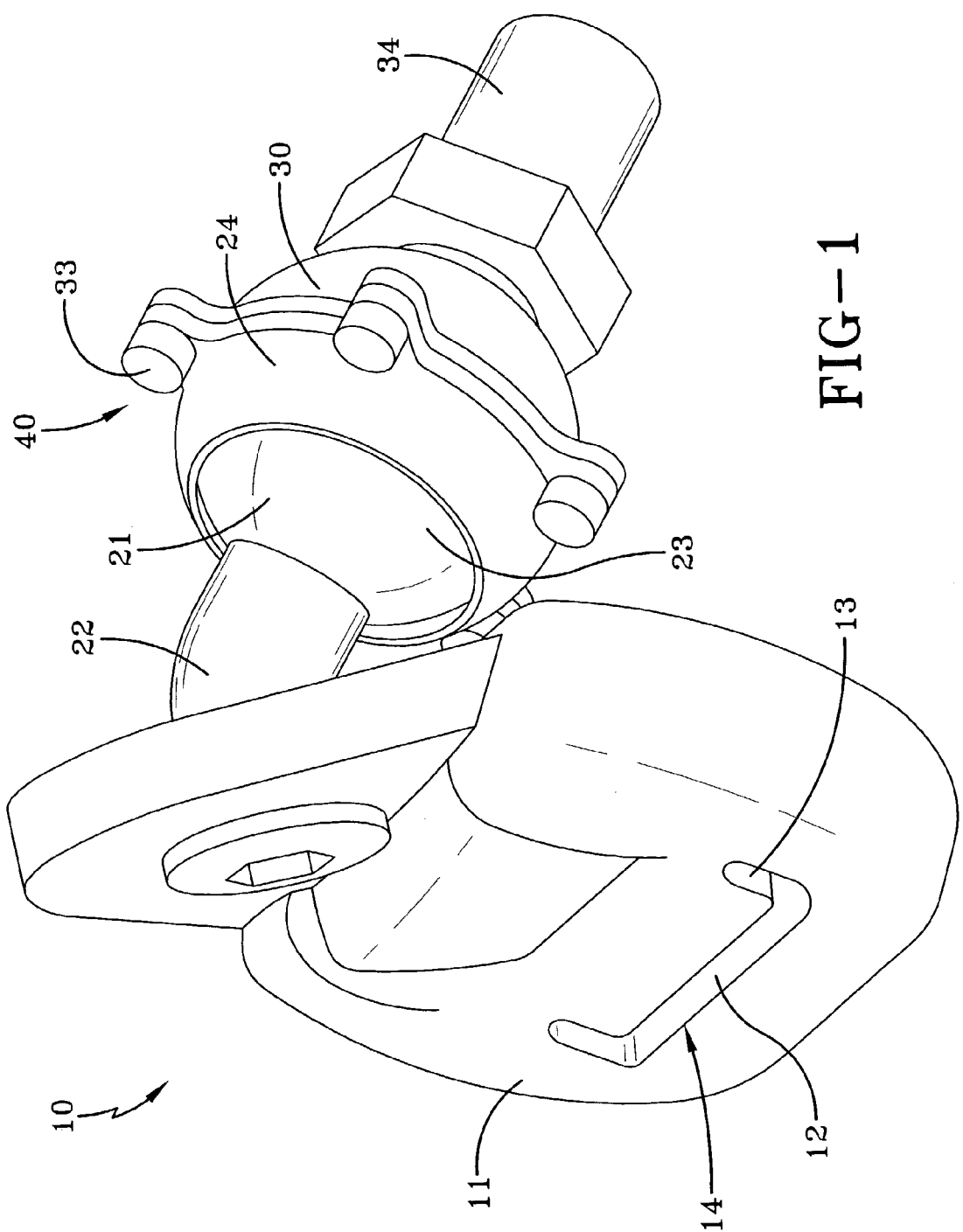
FIG. 1 shows a perspective view of a D-ring assembly.

Referring to FIG. 1, the D-ring assembly 10 includes a D-ring 11 and a load-limiting device 40. The D-ring 11 has a slot 14 therethrough for receiving the seatbelt webbing. The continuous seatbelt webbing is anchored to the vehicle floor on one end and the other end is connected to a seatbelt retractor. The seatbelt webbing passes through the slot 14 of the D-ring 11, which is located proximate to the vehicle occupant's shoulder. The primary function of the D-ring 11 is to guide the continuous webbing from the retractor to the torso area of a vehicle occupant. The slot 14 is U-shaped whereby the center portion 12 is slightly longer than the width of the seat belt webbing. The purpose of the end portions 13 of the slot 14 is to prevent the seat belt webbing from "bunching" during use.

Figure 2:
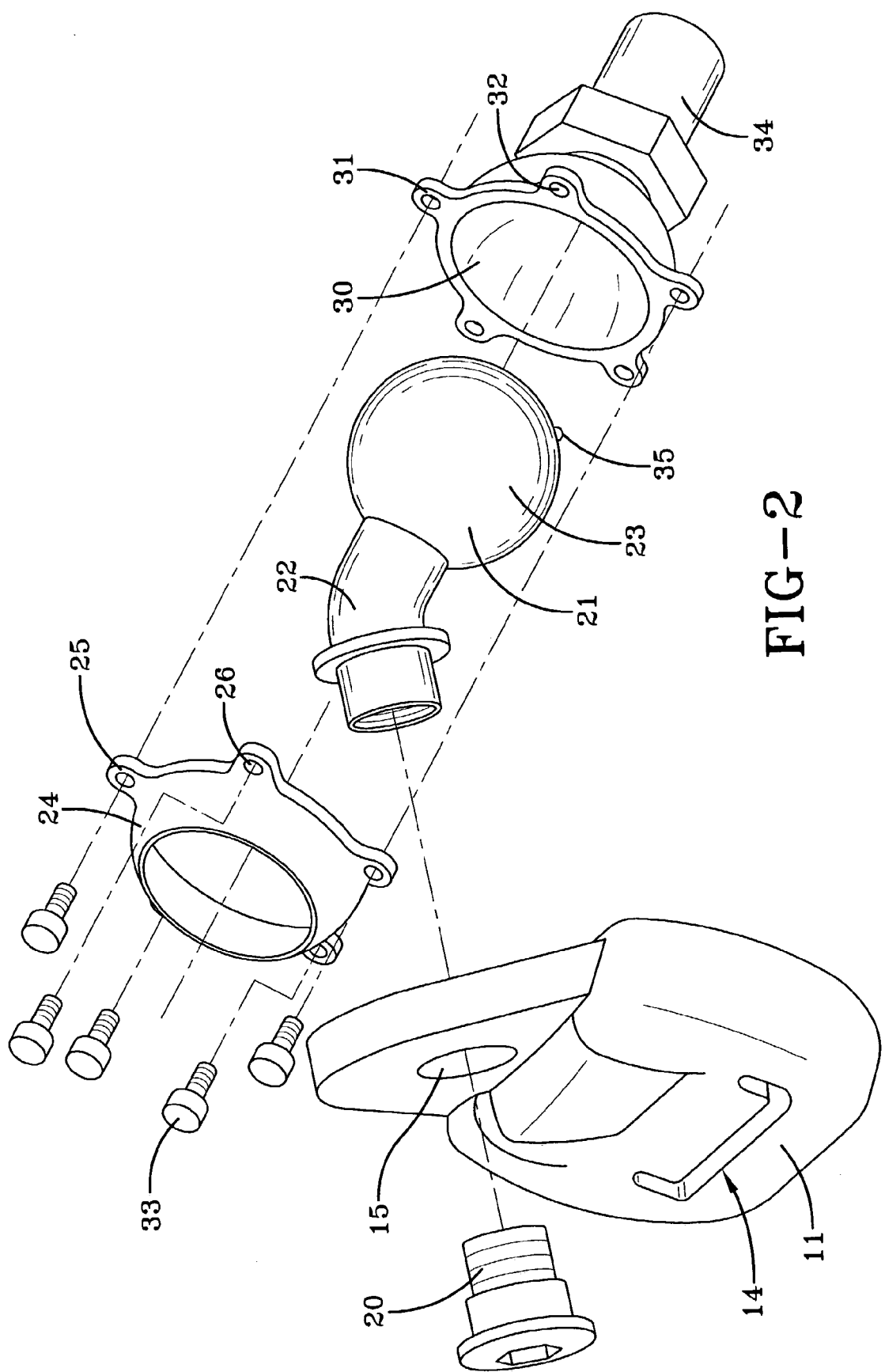
FIG. 2 shows an exploded view of a D-ring assembly.

With reference to FIG. 2, above the slot 14 of the D-ring 11 is an aperture 15 for receiving a first fastening means 20 for the D-ring assembly 10. Examples of suitable fastening means include rivets, nuts and bolts, screws, and the like.

The first fastening means 20 for the D-ring assembly 10 rotationally attaches the D-ring 11 to the swivel member 21. In accordance with the present invention, the D-ring 11 is free to rotate back and forth around the first fastening means 20, which affords comfort to a vehicle occupant during use of the seat belt.

The load limiter device in accordance with the present invention is an intermediate member of the D-ring assembly 10 disposed between the D-ring 11 and the mounting threaded bolt 34 for fastening the D-ring assembly 10 to a structural support member of a vehicle such as the B-pillar. The components of the load limiter device include the swivel member 21, the deforming member 35, the socket cover 24, and the socket 30. The swivel member 21 can best be seen from FIG. 2 and comprises a connecting member 22 extending from a swivel ball 23. The connecting member 22 is a curvilinear member that interfaces with the D-ring 11. The swivel ball 23 has essentially a circular shape and has a small recess for the placement of a deforming member 35, preferably a small, hardened ball. The deforming member 35 of the present invention is illustrated in FIG. 2 as a ball, but it is contemplated that other shaped deforming members may be employed such as square, rectangle, cone, diamond, and the like. The hardened ball is fixed to the recess via an adhesive whereby a portion of the hardened ball extends beyond the surface of the swivel ball 23.

The swivel ball 23 is mounted in a socket 30 and the deforming member 35 impedes rotation of the swivel ball 23. The socket 30 is bowl shaped that receives about half of the swivel ball 23. The socket 30 has a plurality of socket attachment arms 31 radiating from the top of the socket 30. The socket cover 24 is a physical part that is responsible for rotatably securing the swivel ball 23 to the socket 30, whereby the socket cover 24 has an equivalent number of socket cover attachment arms 25 as the socket attachment arms 31. The socket cover attachment arms 25 have first holes 26 therethrough, whereby there is one hole for each attachment arm, and the socket attachment arms 31 have second holes 32 therethrough, whereby there is one hole for each attachment arm. The diameter of the first holes 26 corresponds to the diameter of the second holes 32 and during assembly of the D-ring assembly 10, the first holes 26 are aligned with the second holes 32 so that a second fastening means 33 can secure the socket cover 24 to the socket 30. Examples of fastening means include rivets, bolts and nuts, screws, and the like.

The socket cover 24 is a hollow, circular ring with a radius gradient. The part of the socket cover 24 having the largest radius has a radius smaller than the maximum radius for the swivel ball 23. This radius differential allows the socket cover 24 to slide over a portion of the swivel ball 23 without being able to slide over the entire swivel ball 23. For assembly purposes, the socket cover 24 is inserted around the connecting member 22 and the socket cover attachment arms are connected to the socket attachment arms 31.

Figure 3:
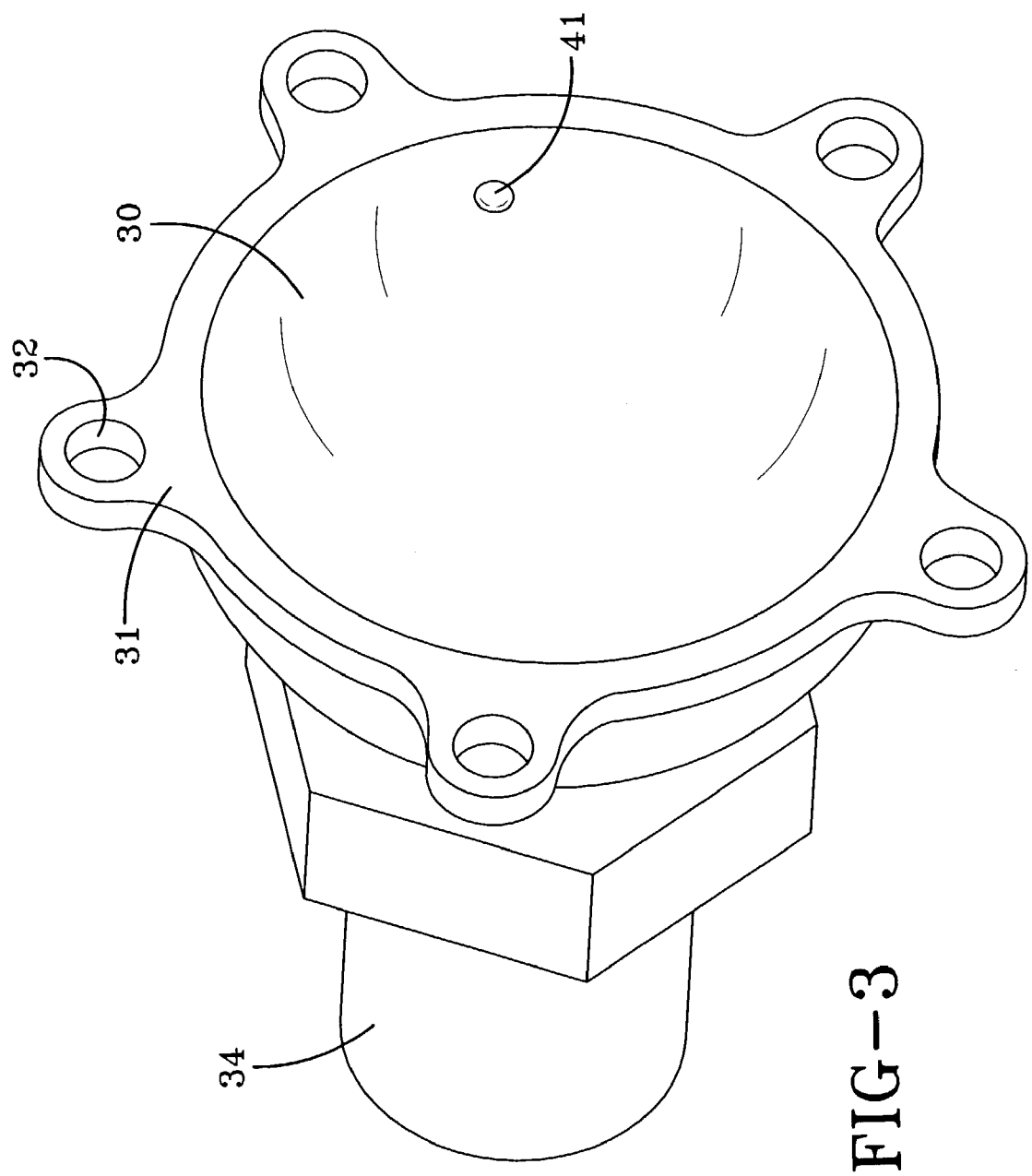
FIG. 3 shows a perspective view of a socket of the D-ring assembly.

With reference to FIG. 3, the socket 30 has a dimple 41 for receiving the deforming member 35, preferably the hardened ball. The preferred embodiment for the present invention has only one deforming member, but one of ordinary skill in the art appreciates that the present invention may have multiple deforming, members. The dimple 41 in the socket 30 has the substantially the same dimensions as the recess in the swivel ball 23. The purpose of the dimple 41 in the socket 30 is to facilitate the initial deforming of the socket 30 during a situation when a predetermined amount of force on the D-ring 11 is reached.

Integrated into the socket 30 is a mounting threaded bolt 34 as seen in FIG. 1. The threaded bolt 34 is utilized to attach the D-ring assembly 10 to a support structure of a vehicle such as a B-pillar or a C-pillar. It is contemplated that the threaded bolt 34 does not have to be integrated with the socket 30, but instead the threaded bolt 34 may be a separate physical component for the D-ring assembly 10.

Figure 4:
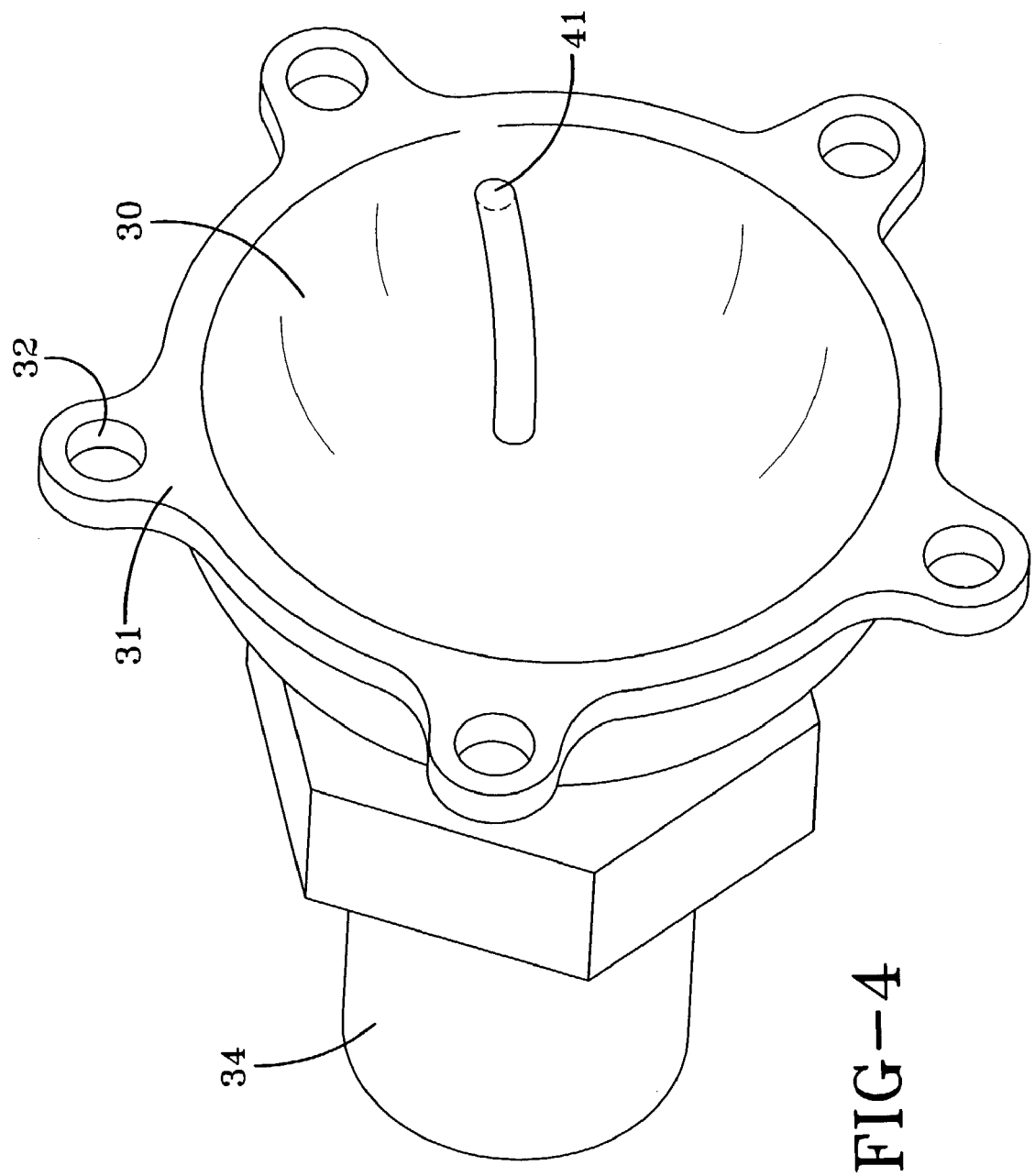
FIG. 4 shows the socket from FIG. 3 with a channel formed thereon from the hardened ball.

The present invention functions by absorbing kinetic energy from a vehicle occupant during a vehicle crash. Before a crash, the swivel ball remains in a first position. The swivel ball 23 is prevented from rotating about the socket 30 due to the presence of the hardened ball. During a vehicle crash, the vehicle occupant applies force to the seat belt webbing and the load limiter device of the present invention dissipates this force in a controlled manner via a deformation process, and the swivel ball 23 moves from a first position to a second position. The second position is the position where the swivel ball 23 rests after the vehicle occupant ceases to decelerate. Since there is not a pre-existing channel in the socket 30, the deforming member 35 creates a channel or a groove, which is illustrated in FIG. 4. The hardened ball needs to be tightly secured to the recess in the swivel ball 23 to prevent the hardened ball from coming loose from the swivel ball 23 during the deforming process. Furthermore, the hardened ball needs to be harder than the socket 30 so the hardened ball is able to deform the socket 30 without being deformed. There is no predetermined path for the channel in the socket 30, and the direction of the channel will be dependent upon the characteristics of the crash and the size and weight of the occupant. If the D-ring does not have an adjustable height option, the height of the occupant will directly impact the orientation of the D-ring, thus affecting the path for the channel. Also, the severity of the crash along with the mass of the occupant will affect the length of the channel. The D-ring assembly 10 has a stop feature, which will prevent the D-ring from continuing to move in the direction of the front of the vehicle. The D-ring will be "stopped" when the connecting member 22 of the swivel member 21 is in a position where it contacts the socket cover 24, and at this point, the swivel ball 23 will no longer be able to rotate.

As discussed herein, the hardened ball is fixed to the recess in the swivel ball 23, and the socket 30 is capable of being deformed. Alternatively, the hardened ball may be fixed to the dimple 41 in the socket 30, whereby the hardened ball creates a channel or groove in the swivel ball 23.

There are certain features of the load limiting device 40 that allow the performance of the load limiting device 40 to be selectively designed or tuned for a particular occupant restraint. Those features include the size and shape of the deforming member and the type of material selected for the socket 30.

Many changes and modifications in the above-described embodiments of the invention can, of course, be carried out without departing from the scope thereof. Accordingly, that scope is intended to be limited only by the scope of the appended claims.

I claim:

1. A load limiting device for a seatbelt D-ring comprising:
    a swivel ball having a connecting member extending therefrom for attaching the swivel ball to the D-ring;
    a socket for receiving the swivel ball, the socket encloses a portion of the swivel ball; and
    a deforming member being smaller than the swivel ball and the deforming member is partially embedded in the swivel ball whereby the swivel ball rotates to form a channel in the load limiting device when the D-ring is subjected to a predetermined amount of force.

2. The load limiting device according to claim 1 wherein the deforming member is a hardened ball.

3. The load limiting device according to claim 1 wherein the connecting member has a curvilinear shape.

4. The load limiting device according to claim 1 wherein the deforming member is made from a harder material than the socket.

5. The load limiting device according to claim 1 wherein the deforming member is made from a harder material than the swivel ball.

6. The load limiting device according to claim 5 wherein the socket cover is disposed between a D-ring and the socket, the socket cover slides over a portion of the swivel ball whereby the socket cover has a maximum diameter that is smaller than the maximum diameter of the swivel ball.

7. The load limiting device according to claim 1 further comprising a socket cover for rotationally attaching the swivel ball to the socket.

8. The load limiting device according to claim 1 wherein the socket encloses about half of the swivel ball.

9. The load limiting device according to claim 1 wherein the channel is formed in the socket.

10. The load limiting device according to claim 1 wherein the channel is formed in the swivel ball.

11. The load limiting device according to claim 1 wherein the deforming member is made from a harder material than the socket whereby upon the application of a predetermined amount of force on the D-ring assembly, the deforming member creates a channel in the socket.

12. A D-ring assembly comprising:
a D-ring attached to a vehicle for guiding a seat belt webbing in a direction of a vehicle occupant, wherein the D-ring comprises a slot therethrough for the passage of the seat belt webbing;
a swivel member comprising a swivel ball having a connecting member extending therefrom connecting the swivel ball to the D-ring, the swivel ball is retained in a socket; and
a deforming member partially embedded in the swivel ball, whereby the swivel ball rotates upon a load on the D-ring exceeding a predetermined value.

13. The D-ring assembly according to claim 12 wherein the D-ring has an aperture for receiving the first fastening means.

14. The D-ring assembly according to claim 12 wherein the connecting member has a curvilinear shape wherein the first fastening means secures the D-ring to the connecting member of the swivel member.

15. The D-ring assembly according to claim 12 further comprising a socket cover that slides over a portion of the swivel ball whereby the socket cover has a maximum diameter that is smaller than the maximum diameter of the swivel ball.

16. The D-ring assembly according to claim 15 wherein the socket cover has radiating socket cover attachments arms and the socket has radiating socket attachments arms; the socket cover attachments arms are secured to the socket attachment arms.

17. The D-ring assembly according to claim 12 wherein the deforming member is a hardened ball.

* * * * *